United States Patent [19]

Saretzky

[11] 4,397,376
[45] Aug. 9, 1983

[54] PROGRESSIVE-CENTRAL LUBRICATION SYSTEM

[75] Inventor: Horst Saretzky, Ennepetal, Fed. Rep. of Germany

[73] Assignee: De Limon Fluhme GmbH & Co., Düsseldorf, Fed. Rep. of Germany

[21] Appl. No.: 235,289

[22] Filed: Feb. 17, 1981

[30] Foreign Application Priority Data

Mar. 3, 1980 [DE] Fed. Rep. of Germany ....... 3008053

[51] Int. Cl.³ .............................................. F16N 25/02
[52] U.S. Cl. .................................... 184/7 D; 184/7 E
[58] Field of Search ...................... 184/7 D, 7 E, 7 F; 222/250; 137/625, 625.11

[56] References Cited

U.S. PATENT DOCUMENTS

| | | | |
|---|---|---|---|
| 2,346,801 | 4/1944 | Venable | 184/7 E |
| 2,905,270 | 9/1959 | Jackson | 184/7 E |
| 3,145,803 | 8/1964 | Cobert | 184/7 D |
| 3,526,299 | 9/1970 | Kiefer | 184/7 D |
| 3,527,322 | 9/1970 | Roberts | 184/7 E X |
| 3,958,725 | 5/1976 | Reeve | 184/7 D X |
| 4,044,924 | 8/1977 | Saretzky | 184/7 E X |

FOREIGN PATENT DOCUMENTS

| | | |
|---|---|---|
| 2023774 | 10/1972 | Fed. Rep. of Germany . |
| 354995 | 7/1961 | Switzerland ............... 184/7 D |
| 359936 | 3/1962 | Switzerland ............... 184/7 D |

*Primary Examiner*—David H. Brown
*Attorney, Agent, or Firm*—Martin A. Farber

[57] ABSTRACT

The central lubricating system has a progressive distributor (3) and a pump connected to the pressure connection of the initial segment of the progressive distributor, in particular for the manual feeding of lubricant by a hand pump or a lubricating gun. In order to improve such a central lubricating system so that upon manual or equivalent feeding of the lubricant preselected or adjustable delivery quantities of the progressive distributor are obtained by controlled cycles there is provided a predosaging unit (1) which contains a piston (16) which is arranged in the cylindrical space (12), can be displaced between two end positions and is spring-loaded at one end (spring 19). The cylindrical space (12) is divided by the piston into two working chambers (17, 18) which are connected to each other by a closable lubricant changeover canal (26), one of which chambers (18) is connected with the pressure connection of the progressive distributor and with a feed line (22) while the other (17) is connected to a control segment (6) of the progressive distributor.

10 Claims, 3 Drawing Figures

PROGRESSIVE-CENTRAL LUBRICATION SYSTEM

The present invention relates to a central lubricating system having a progressive distributor and a pump connected to the pressure connection of the initial segment of the progressive distributor, particularly for the mechanical feeding of lubricant by a hand pump or a lubricating gun.

Central lubricating systems having progressive distributors are used in particular for the lubrication of small and medium-size machines. They are suitable for grease and oil as the lubricant. In their simplest embodiment such central lubricating systems for manual feed consist of a progressive distributor consisting of a plurality of individual segments which are screwed together and sealed off from each other and the outlets of which are connected by a corresponding number of conduits with the points of friction which are to be lubricated, the lubricant being fed by a lubricating gun or a lubricating nipple to the pressure connection of the initial segment of the progressive distributor. Under the lubricant pressure, pistons present in the distributor segments are so controlled in a given sequence that lubricant is discharged cyclically through the distributor outlets to the points of friction. They have the disadvantage that these manual feed amounts as well as the amounts of lubricant fed, for instance, by a manually actuated feed pump or a pneumatic barrel pump are uncontrolled and accordingly it is left to the knowledge of the operator entrusted with the lubrication to estimate the correct amount of lubricant to be fed to the points of friction. As a result of the uncontrolled lubricating process there is the danger that the points of friction either will be lubricated insufficiently or will be over-lubricated.

The object of the present invention is to improve a progressive central lubricating system of the above-described type in such a manner that in the case of manual or equivalent feeding of the lubricant, preselected or adjustable delivery quantities of the progressive distributor are obtained by controlled cycles.

In order to achieve this purpose there is proposed in accordance with the invention, a central lubricating system which is featured by a predosaging unit which contains a piston which is arranged in a cylindrical space, is displaceable between two end positions and is spring-loaded at one end, the piston dividing the cylindrical space into two working chambers one of which is connected with the pressure connection of the progressive distributor and a feed line, while the other is connected to a control segment of the progressive distributor, the two working chambers being connected together by a closable lubricant changeover canal. By means of such a predosaging unit connected to a given known progressive distributor the result is obtained that even upon manual feed, for instance the attachment of a lubricating gun to the feed line, dosaged quantities of lubricant can be supplied to the points of friction. The progressive distributor is enabled to carry out a preselected desired number of cycles and accordingly excess or insufficient lubrication can be avoided. For this, there is connected to the two outlets of the predosaging unit a progressive distributor which is provided in known manner with a control segment which sees to it that the piston of the initial segment is only moved when lubricant is fed to it by the predosaging unit from the control line. The control segment is not connected with the pressure connection in the initial segment of the progressive distributor and receives its supply of lubricant exclusively from the predosaging unit. Heretofore such progressive distributors with control segment in accordance with DE-PS 20 23 774 were used only for connecting in parallel a plurality of progressive distributors.

In order to be able to adjust the predosing to different delivery quantities it is advantageous to develop the piston stroke and/or the work volumes of the working chambers so that they are variable. This can be made possible structurally in simple manner in particular by the fact that the cylindrical space comprises a borehole through the housing of the predosaging unit, said borehole being closed at each end by a screw, the depth of penetration of the screws controlling the working volume of the corresponding working chambers.

In accordance with a preferred embodiment of the invention, the piston of the predosaging unit is provided with a movement indicator on the end opposite the spring. This indicator can be combined with an adjustment device for limiting the stroke of the piston.

In accordance with one suitable development of the teaching of the invention it is proposed to make the operational volume of the working chamber on the spring side of the piston greater than that of the other working chamber. This has the result that upon the shifting of the lubricant from the feed side to the spring-pressure side a slightly smaller amount of lubricant passes to the spring pressure side, as a result of which the central lubricating system is relieved of pressure after performance of a lubricating cycle so that any danger of blocking of the piston of the predosaging unit is avoided even in the long term.

In order to make certain that the lubricant changeover canal is closed at the time of the delivery of lubricant by the predosaging unit and is opened only for the transfer of the lubricant, it is advantageous to develop the changeover canal in such a manner that it can be closed by a closure piston which is biased by a spring into the open position, the piston being moved by means of a lever in positive manner into the closed position when and as long as a feed of lubricant is connected to the feed line. The changeover canal can be a central bore in the closure piston which terminates in annular grooves of the closure piston, whereby it is possible to make the cylindrical bore of the piston in the housing of the predosaging unit parallel to that of the closure piston, which simplifies the manufacture of the predosaging unit.

Further details, features and advantages of the object of the invention will become evident from the following description of the accompanying drawing in which preferred embodiments of the central lubricating system of the invention and of the predosaging unit are diagrammatically shown. In the drawing.

Figure 1:
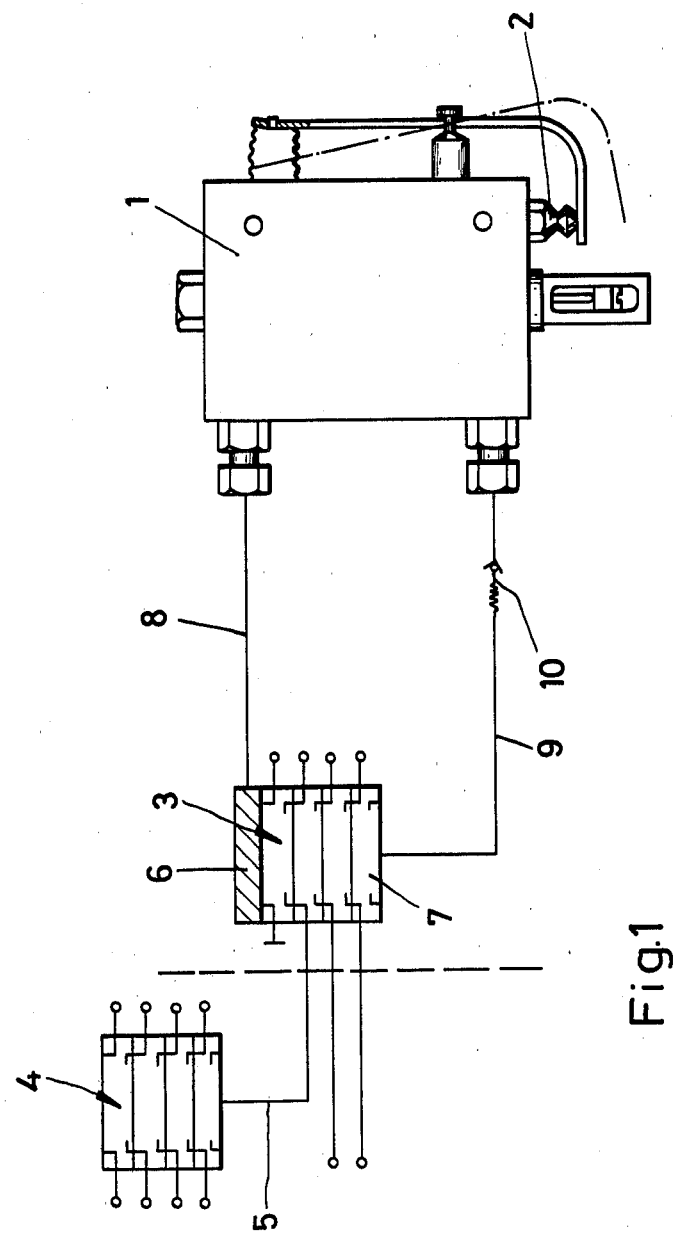
FIG. 1 shows a progressive central lubricating system of the invention.

The system shown is a progressive central lubricating system with a predosaging unit 1 for lubricant fed via a lubricating nipple 2, for instance by a lubricating gun, having a primary progressive distributor 3, a secondary progressive distributor 4 and fourteen friction points to be supplied with lubricant which are connected to the individual outlets (unnumbered) of the two progressive distributors 3 and 4.

The secondary progressive distributor 4 consists of four individual segments which are screwed together and sealed off from each other and each of which is equipped with a piston (not illustrated) which is pressed by the lubricant alternately into its two end positions. By means of annular grooves the pistons are so controlled in given sequence that the next piston can be displaced only when the piston movement of the preceding piston has practically terminated. All piston bores in this type of distributor are connected by a central bore directly to the lubricant inlet in the initial segment, which is supplied via the line 5 from an outlet of the primary progressive distributor 3.

The primary progressive distributor 3, in contradistinction to the secondary progressive distributor 4 which has just been described, has an end segment 6 which receives its supply lubricant not from the supply connection in the initial segment 7 but from the predosaging unit 1 via the line 8. The initial segment 7 is connected via the line 9, in which a non-return valve 10 is contained, to the second outlet of the predosaging unit 1 whose inner construction will be described further below. In the case of the primary progressive distributor 3, the pistons in the central segments operate independently of the pressure in the line 8, until it is the turn of the piston in the initial segment 7. The latter piston, however, is only moved when lubricant is fed to it from the line 9, i.e. by the predosaging unit 1. The precise inner construction of the two progressive distributors 3 and 4 is not shown in the drawing or described since they are already known per se.

Figure 2:
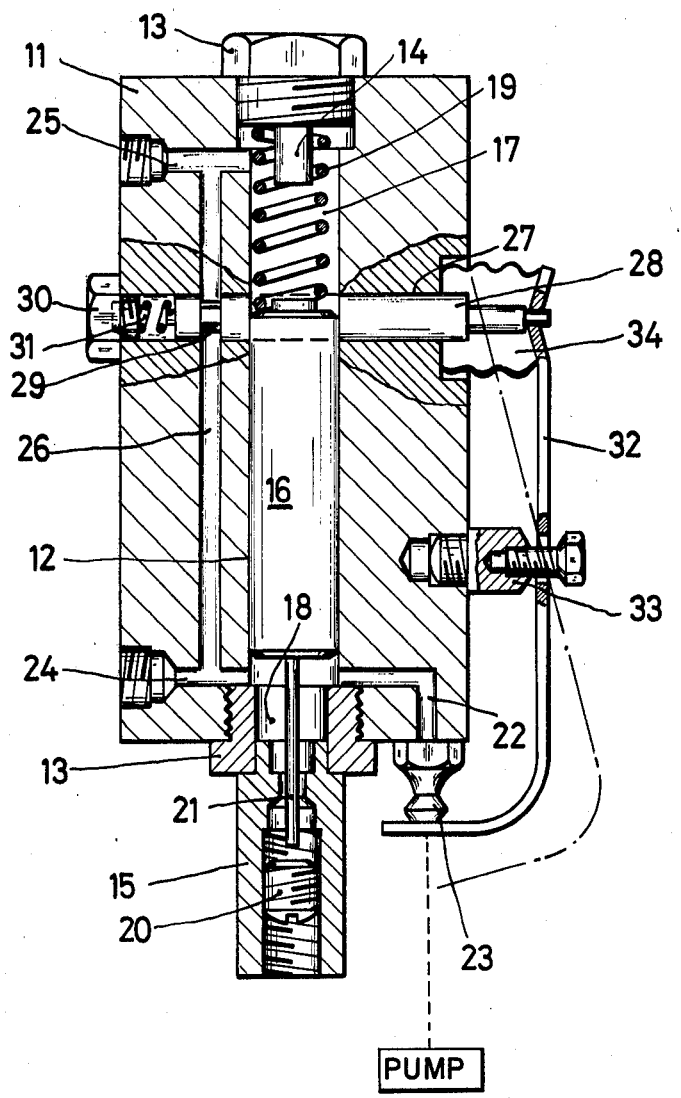
FIG. 2 shows one embodiment of a predosaging unit.

The predosaging unit 1 shown in FIG. 2 of the drawing has, within a steel housing 11, a continuous piston bore 12 which is closed on top by a screw 13 having a projection 14 and at the bottom by a setting device 15. Within the piston bore 12 there is arranged a piston 16 which subdivides the existing cylindrical space into two working chambers 17, 18. The piston 16 is biased by a spring 19 arranged in the working chamber 17 in the direction towards an end position which is formed by a set screw 20 of the setting device 15 together with a movement indicator 21 fastened to the piston.

Within the work chamber 18 there discharges a feed line 22 through which, via a screwed-in nipple 23, lubricant can be fed to the working chamber, the lubricant passing through an outlet canal 24 into the line 9 and to the primary progressive distributor 3. Similarly to the working chamber 17 there is connected an outlet canal 25 which is connected via the line 8 to the end segment 6 of the primary progressive distributor 3. The two outlet canals 24, 25 are connected together by a changeover canal 26 which is formed parallel to the piston bore 12 in the housing of the predosaging unit 1. For simplification it is illustrated in FIG. 2 of the drawing in the plane of the drawing but it actually lies behind the piston bore 12 since, in order to control the opening of the changeover canal 26, a closure piston 28 having an annular groove 29 is arranged in a transverse bore 27. The transverse bore 27 is closed by a screw 30 which holds a spring 31 against the action of which the closure piston can be displaced by means of a lever 32. The lever 32 is swingably mounted about its central support 33, as indicated in dot-dashed line in the drawing, and in its normal position its bent end covers the nipple 23. By means of a bellows 34 the closure piston 28 is closed off from the outside in a dust-tight manner.

Figure 3:
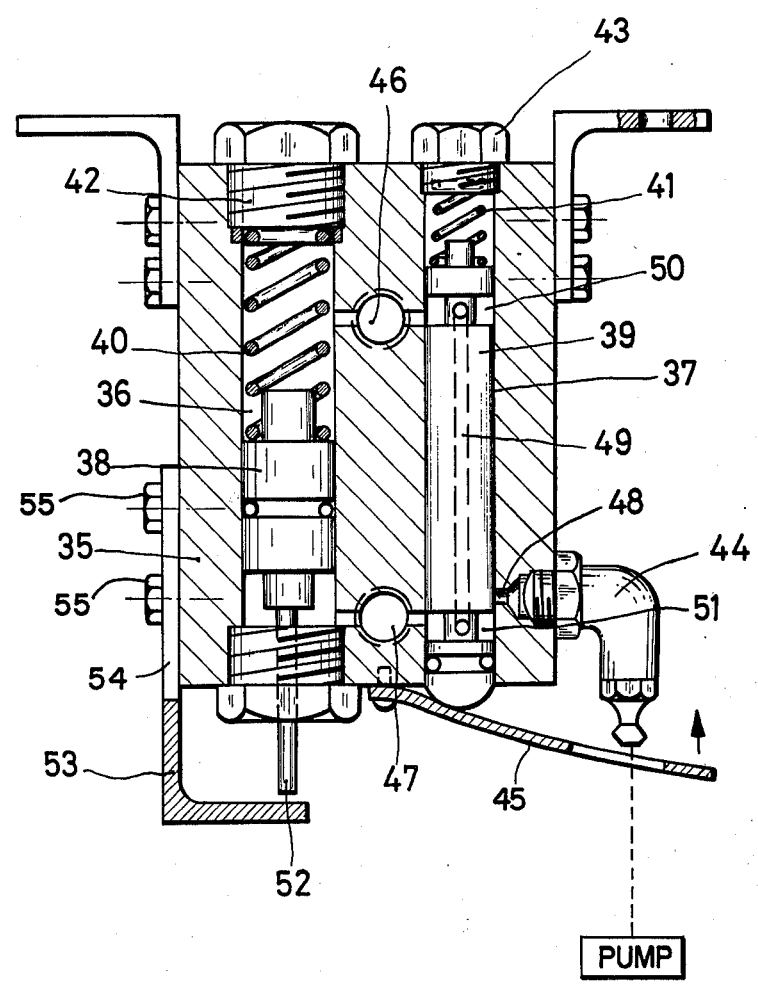
FIG. 3 shows another embodiment of a predosaging unit.

FIG. 3 of the drawing shows a modified embodiment of a predosaging unit. In this case two boreholes 36, 37 are drilled in a housing 33 parallel to and spaced apart from each other, serving to receive a dosaging piston 38 on the one hand and a closure piston 39 on the other hand respectively. The pistons 38, 39 are acted on by springs 40, 41, respectively whose abutments are screws 42, 43 inserted into the bores 36, 37, respectively.

A lubricating nipple 44 is screwed into the housing, the nipple being so covered by a spring-steel lever 45 that said lever 45 must be pressed down in order to attach a lubricating gun. This movement is transmitted to the closure piston 39 which is thereby pressed against the action of the spring 41 into a closed position. The canals formed in the housing 35 for connecting the working chambers of the dosaging unit to outlets 46 and 47 as well as the feed line 48 correspond analogously to the dosaging unit of FIG. 2 described above. For connecting the working chambers to each other a changeover canal 49 is formed centrally in the closure piston 39, said canal terminating in annular grooves 50, 51 which correspond to the corresponding canals.

The setting device for the dosaging piston 38, in the embodiment of FIG. 3, comprises a movement indicator 52 and an angle plate 53 which is displaceably screwed to the housing via a slot 54 and screws 55.

For supplying the fourteen friction points with lubricant, a lubricating gun or pump is applied to the nipple 2 or 23 or 44 of the predosaging unit, after either the lever 32 has been swung away and the closure piston 28 thereby blocks the changeover channel 26 or—in the other embodiment—the spring-steel lever 45 has been pressed down and the closure piston 39 thus brought into such a position that no lubricant can be displaced through the changeover canal 49.

Referred to the embodiment shown in FIG. 2 of the drawing, lubricant can now pass through the work chamber 18, the outlet canal 24, and the line 9 into the initial segment 7 of the primary progressive distributor 3, whose pistons, acted on in this manner, travel into their end positions and thereby dispense lubricant to the connected friction points or to the secondary distributor 4 and its connected friction points, the cycle being interrupted due to the piston of the initial segment 7 which has not yet been acted on via the end segment 6. In this way a pressure build-up takes place which displaces the piston 16 against the action of the spring 19, whereby a volume of lubricant is displaced which passes through the outlet canal 25 and the line 8 to the end segment 6 of the primary progressive distributor and continues the cycle.

The number of lubricating cycles is dependent on the position of the piston 16, in combination with the feed volume and reception volume of the first working piston of the connected primary progressive distributor 3.

For example, the delivery volume of the working chamber 17 can amount to a total of 2 cc. If the reception volume of the cylindrical space of the first working piston of the primary progressive distributor is 0.2 cc both to the left and to the right of the piston, then 2:0.4=5 cycles of revolution are carried out for one lubricating process.

The number of segments or the size of the distributor can be selected independently of this and different piston diameters of the other work pistons in the distributor can also be used for adaptation to the lubricant requirement of individual friction points. In this way the central lubricating system can be adapted extremely accurately to the different lubricating requirements of individual friction points.

After the lubricating process the lubricating gun is removed from the nipple 23 and the closure piston 28 comes into its starting position. In this way the changeover canal 26 is made passable via the annular groove 29 and the lubricant present in the working chamber 18 is transferred under the restoring force of the spring 19. In this connection it is to be noted that due to the movement indicator 21, the changeover volume in the work chamber 18 is smaller than the reception volume of the working chamber 17 so that upon the changeover a slightly smaller amount of lubricant passes to the working chamber 17, as a result of which the system is relieved from pressure towards the primary progressive distributor 3.

The predosaging unit of FIG. 3 operates in accordance with the same principle. It can be seen that by the predosaging unit there are dispensed to the primary progressive distributor 3 preselected or adjustable control quantities which make it possible for the progressive distributor to carry out only a desired number of circulation cycles.

I claim:

1. In a central lubricating system having a progressive distributor with control segments and a pump operatively connected to a pressure connection of an initial segment of the progressive distributor, in particular for the manual feeding of lubricant by a hand pump or a grease gun, the improvement comprising
   a predosaging unit defining a cylindrical chamber, including,
   a piston disposed in said cylindrical chamber displaceably between two end positions,
   a spring engages one end of said piston,
   said piston divides said cylindrical space into two work chambers,
   a closable lubricant changeover canal connects said two work chambers with each other, one of said chambers is connected to the pressure connection of the progressive distributor as well as to a feed line, the other of said two work chambers is connected to one of the control segments of the progressive distributor.

2. The central lubricating system according to claim 1, wherein
   said predosaging unit includes a housing,
   said cylindrical space is a bore formed through said housing,
   one screw means closes each of the ends respectively of said bore.

3. The central lubricating system according to claim 1, wherein
   a first of said two work chambers at said one end of said piston has a work volume on the spring side of the piston larger than the work volume of a second of said two work chambers at the other end of the piston.

4. The central lubricating system according to claim 1, further comprising
   at least one secondary progressive distributor is connected to said first-mentioned progressive distributor.

5. The central lubricating system according to claim 1, further comprising
   means for adjusting the stroke of said piston.

6. The central lubricating system according to claim 1 or 5, further comprising
   means for adjusting the work volumes of said work chambers.

7. The central lubricating system according to claim 1, wherein
   a movement indicator is operatively connected to the other end of said piston.

8. The central lubricating system according to claim 7, further comprising
   setting means for limiting the stroke of said piston combined with said movement indicator.

9. The central lubricating system according to claim 1, further comprising
   a closure piston means for closing said changeover canal,
   spring means for biasing said closure piston into an opening position of said changeover canal,
   lever means for positively moving said closure piston into a closing position of said changeover canal when and as long as the pump is connected to the feed line.

10. The central lubricating system according to claim 9, wherein
    said changeover canal is a central bore formed in said closure piston, said closure piston is formed with annular grooves at said opposite ends thereof, said bore terminates in said annular grooves of the closure piston.

* * * * *